United States Patent [19]

Green et al.

[11] Patent Number: 4,464,074

[45] Date of Patent: Aug. 7, 1984

[54] CONNECTOR AND WEB STIFFENER

[75] Inventors: William J. Green, Lake Forest; Ralph P. Semmerling, Mount Prospect, both of Ill.

[73] Assignee: United States Gypsum Company, Chicago, Ill.

[21] Appl. No.: 334,776

[22] Filed: Dec. 28, 1981

[51] Int. Cl.³ .............................................. F16B 9/02
[52] U.S. Cl. .................................. 403/192; 403/187; 403/255; 403/230; 52/665; 211/41
[58] Field of Search ................ 52/665, 656; 403/192, 403/187, 252, 255, 295, 230; 211/41

[56] References Cited

U.S. PATENT DOCUMENTS 3,749,432  7/1973  Janssen ........................... 403/292 X
3,778,175  12/1973  Zimmer .............................. 403/187
3,798,865  3/1974  Curtis ............................. 403/189 X Primary Examiner—Cornelius J. Husar
Assistant Examiner—Joseph A. Fischetti
Attorney, Agent, or Firm—Jerome J. Adams; Samuel Kurlandsky; Robert H. Robinson

[57] ABSTRACT

A connector for the interconnection in generally perpendicular array of generally C-shaped elongate structural members having a pair of flanges integrally and perpendicularly connected with the web portion thereof in which said flanges each include a flange return edge which extends inwardly of the generally C-shaped channel, which connector, upon the assembly of said interconnection, provides strengthening of the webs of each said C-shaped structural member, and a floor assembly comprising said connector and said generally C-shaped elongate structural members.

5 Claims, 9 Drawing Figures

CONNECTOR AND WEB STIFFENER

BACKGROUND OF THE INVENTION

1. Field of the Invention

This invention relates to a connector for the interconnection in perpendicular array of generally C-shaped elongate structural members having a pair of flanges integrally and perpendicularly connected with the web portion thereof in which said flanges each include a flange return edge which extends inwardly of the generally C-shaped channel, which connector, upon the assembly of such interconnection, provides strengthening of the webs of each said C-shaped structural member.

2. Description of the Prior Art

Lightweight metal structural framing members, such as steel joists, provide efficient and economical means for the construction of intermediate size buildings. The basic components of lightweight metal structural framing systems are studs, stud tracks or runners and joists, and each component is currently manufactured in a wide assortment of widths, lengths and thicknesses or gauges to meet a broad range of load and functional requirements. To speed enclosure of such intermediate size buildings, the cutting and assembly of components for wall sections can be performed off-site and under sheltered conditions, and complete sections may be then prefabricated for shipment to the job site. However, prefabrication of floor, ceiling and roofing sections off-site for shipment to the field or to the job site is generally neither economically nor logistically possible when those sections are extraordinarily large or heavy, given the size and weight of such pre-assembled sections, which make necessary heavy equipment for the placement of such sections in the field and preclude lifting such pre-assembled sections into place by hand. Assembly in the field thus being necessary for large or heavy floor, ceiling and roof systems comprising light metal framing, ease of assembly in the field becomes critical for human safety, logistic and economic reasons. Up to the present time, joists and other generally horizontal framing members have been joined one to another in mutually perpendicular array, as for example a floor joist to a rim joist, through the use of various "L"-, "C"- or "U"-shaped closures, clips or brackets. One of the difficulties attendant the use of such known closures, clips or brackets is the necessity of supporting the joist or other generally horizontal framing member being moved into place for perpendicular attachment to a fixed or permanent like said joist by hand or by mechanical means until secure screw or other fastener attachment between the fixed or permanently placed joist and the joist being moved into perpendicular array thereto can be obtained.

Another disadvantage or, more properly, lack of advantage in the closures, clips and brackets in current use for the attachment of generally C-shaped lightweight metal framing members one to another in mutually perpendicular array is that none of the prior art articles provide protection against joist web crippling by functioning as web stiffeners. Structural framing systems comprising lightweight metallic framing members are not suitable for the carrying of concentrated loads or reactions, or the vectoral components thereof, when such loads or reactions act perpendicular to the longitudinal axis or elongate dimension of the framing member, and also act in the plane of the web of the framing member and further when such loads or reactions force the rotation of the web out of its plane along the bearing length, for such loads or reactions cause respectively, compressive stresses and shear stresses in that web to the point of ultimate structural failure of the web, that is, web crippling. As provided by the American Iron and Steel Institute of Washington, D.C., in its publication *Specification for the Design of Cold-Formed Steel Structural Members* of Sept. 3, 1980 in Section 3.5 and particularly in sub-Section 3.5.1, it has been determined that neither concentrated loads nor reactions acting perpendicular to the longitudinal axis or elongate dimension of such a structural member and acting in the plane of the web thereof may exceed certain values when the unreinforced flat webs of said structural flexural members have a flat width ratio, $h/t$, numerically greater than 200, where $h$ is the clear distance between the flanges measured along the plane of the web of that structural member and is given in inches, and where $t$ is the base steel thickness of any element or section, again being given in inches, unless adequate means be provided for the transmission of such concentrated loads or reactions directly from the bearing flange of said generally C-shaped structural member into the web portion of the structural member. Many such means for the transmission of concentrated loads or reactions directly into the web portion of the lightweight metallic structural member are known in the art, and are commonly known as "web stiffeners" for attachment to the web, and provide for the transmission of said loads or reactions from the upper or bearing flange to the lower or non-bearing flange and thus into the web. Such web stiffeners, when properly installed either at the ends of the structural member, or intermediate along the longitudinal axis of that structural member, maximize load bearing capacity in providing reinforcement of the structural under concentrated loads or reactions.

In no device known in the prior art, however, are the capabilities and functions of interconnection of generally C-shaped structural members in mutually perpendicular array and the provision of means for the transmission of concentrated loads or reactions to the web, i.e., web stiffening simultaneously provided.

A further deficiency of the closures, clips and brackets found in the prior art for the attachment of generally C-shaped lightweight metal framing members one to another in perpendicular array is that most such devices require that the fixed or permanently placed joist or other generally horizontal framing member be configured in mutually perpendicular array with other such framing members such that the generally C-shaped configuration face the exterior of that array, making necessary the attachment to that C-shaped configuration a closure to enable that surface to receive collateral finishing materials such as sheathing, stucco, wood or concrete panels, wood or aluminum siding, or composite facing materials.

3. Objects of the Invention

It is accordingly a first object of this invention to provide economic means for the safe and facile interconnection of large or heavy generally C-shaped structural members in mutually perpendicular array, that interconnection to be performed in the field or on the job site without the use of heavy equipment for the placement of said structural members in said array.

It is a further object of this invention to provide web stiffening means to said generally C-shaped structual members in conformity with the standards known in the art as promulgated by the American Iron and Steel Institute for meeting concentrated loads or reactions upon the web of said structural members.

It is a further object of this invention to provide a joist connector and web stiffener which, when used in the construction of horizontal load-bearing systems such as floors or ceilings comprising floor or ceiling joists and rim joists, allows the web of the rim joist to face the exterior, thereby greatly facilitating the attachment of sheathing, facing materials or other collateral materials.

It is therefore a concomitant object of this invention to provide an integral joist connector and web stiffener which can be inserted into the end of a first generally C-shaped structural member, that partial assembly then being inserted between the flanges and adjacent the web of a second like said member, wherein final assembly is effected by rotatably urging the first sub-assembly into register with the flanges and flange return edges of the second said member, thereby providing mutual perpendicularity between each of said generally C-shaped structural members.

SUMMARY OF THE INVENTION

The objects of this invention are attained with the disclosure herein of a novel connector and web stiffener for generally C-shaped structural members. The connector comprises, in cross-section, a generally G-shaped device of a height, or inter-flanges dimension of said structural member, which provides snug insertable engagement between the flanges and adjacent the webs of generally C-shaped structural framing members disposed generally at right angles one to another. Upon insertion of one portion of the connector into the end of one said structural member perpendicular the elongate axis thereof, and upon further insertion of the second portion of said connector perpendicular the elongate axis of a second said structural member, there is provided a generally perpendicular juncture between the two structural framing members. Each of the portions of the joist connector disclosed herein also functions as a web stiffener in transmitting concentrated loads or reaction forces impinging upon the upper flange of the structural member to the lower flange thereof, thereby allowing flexure of the structural member and preventing shear stresses and compressive failure or crippling of the web. That portion of the connector disclosed herein which is insertable at any point along the length of a C-shaped structural member, perpendicular to and interjacent the flanges thereof and perpendicular the elongate dimension of said structural member and adjacent the web thereof, is generally a hollow or tubular rectangular section having chamfers at the intersections of the surface thereof which upon insertion between the flanges of said structural member is next adjacent the web of that structural member, and the imaginary rectangular surfaces or planes defined by the edges or ends of that portion which plane is perpendicular the longitudinal axis of the hollow or tubular rectangular portion and is therefore, upon insertion between the flanges of said structural member, parallel to the flanges thereof and perpendicular to the web thereof. This hollow or tubular rectangular portion is provided with notches in each of the surfaces perpendicular the web of said structural member at the upper and lower edges or ends thereof for the receiving accommodation or register of the flange return edge of said structural member.

The second portion of the joist connector disclosed herein for the insertion into the end of a C-shaped structural member similar to the first said structural member is generally channel-shaped, and is integral with and parallel to the first said portion, being joined thereto through the web of that channel portion which is integral with and an extension of one side of the generally rectangular first hollow or tubular section.

During the assembly of one generally C-shaped structural element to another such structural element in mutually perpendicular array, the order of attachment of the joist connector disclosed herein to said structural members is completely arbitrary. Generally, placing the joist connector into the square-cut end of a first structural member, inserting this partial assembly at an angle between the flanges of a second said structural member and rotatably urging the partial assembly into a position in which the flanges of each structural member lie in the same plane will provide the receiving accommodation or register of the flange return edge of said second structural member with the slots provided in the hollow or tubular rectangular section. Of course, when the generally C-shaped structural members are not of the same web width, the flanges of those structural members will not lie in the same plane, but will, however, be parallel one to the other. In the construction of a flooring assembly wherein said generally C-shaped elongate structural members are arrayed generally mutually parallel for the support of subflooring or flooring, those structural members in that assembly which do not define the periphery thereof are usually referred to as floor joists; those structural members which define the periphery thereof are usually referred to as rim joists. In the use of the connector and web stiffener disclosed herein in such a flooring assembly, the rim joists would generally receive the hollow or tubular rectangular section of that connector, usually spaced apart in final assembly a defined distance "on-center". It follows, then, that the rim joists in that assembly would usually receive the channel portion of the connector in the end or terminal portion of the joist.

It is also possible, of course, to first insert the rectangular portion of the connector and web stiffener clip into the rim joist, followed by insertion of the end or terminal portion of a floor joist upon the channel portion of said connector. However, because of the mechanical advantage to be had from using the width of a floor joist web as a lever arm in rotatably urging the rectangular portion of the connector and web stiffener into position between the flanges of a rim joist into registry with the flange return edges of that joist, the prior installation of the connector into the floor joist, followed by rotatable insertion and urging into position perpendicular the flanges of a rim joist is to be preferred.

Upon installation between the flanges of each a rim joist and a floor joist, and upon attachment of the connector to the web of each said joist at the surfaces of the connector in proximate juxtaposition to each said web, the connector disclosed herein provides the adequate means of transmitting concentrated loads or reaction forces, or the components thereof, to the web of each said joist, adequately distributing those forces acting perpendicular to the elongate axis of the structural member and in the plane of the web thereof, precluding shear and compressive and crippling failure of the web.

DESCRIPTION OF THE PREFERRED EMBODIMENTS

Figure 1:
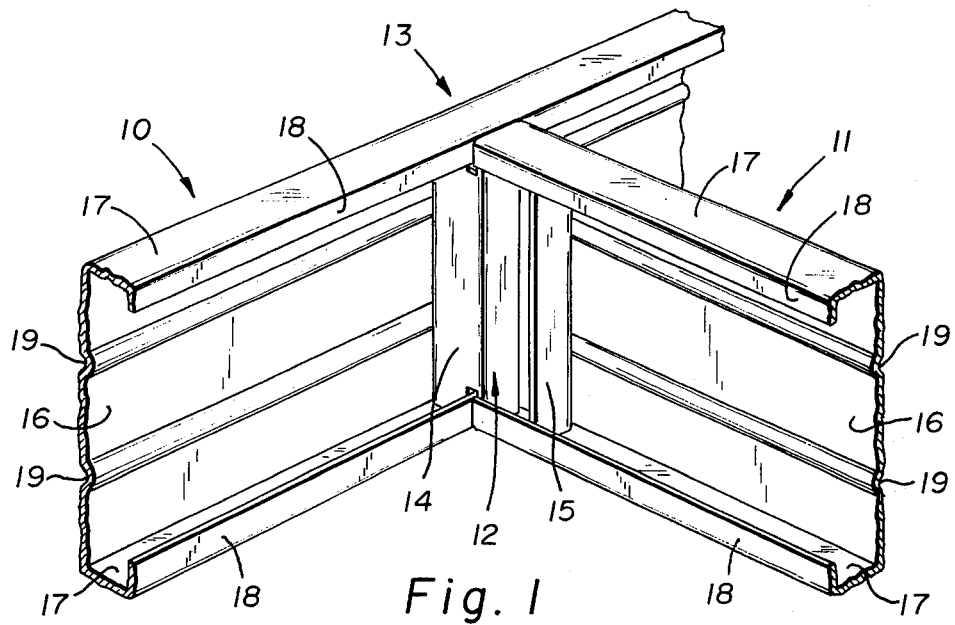
FIG. 1 is a perspective view of the structural joint construction formed of two generally C-shaped elongate structual members each having a pair of flanges, each flange including flange return edges, each said flange being integrally connected with the web portion, said structural members being joined in mutual perpendicularity with the connector of this invention.

FIG. 1 shows in perspective view a structural joint formed of two generally C-shaped structural elements in substantial perpendicularity one to the other using the connector and web stiffener in one of the embodiments of this invention. Generally C-shaped metallic structural elements 10 and 11 are interconnected at essentially a right angle one to the other through the snug insertable engagement between the flanges of metallic structural element 10 of a generally rectangular tubular and hollow first portion 14 of connector 12 and a slideably insertable second portion 15 of clip 12 into metallic structural element 11 to form joint 13 interconnecting metallic structural elements 10 and 11. In this embodiment of the invention, each of the generally C-shaped metallic structural elements 10 and 11 are provided with web portions 16 integrally connected with and generally perpendicular to flange portions 17 which in turn are integral with and generally perpendicular to flange edge return portions 18. The web portion 16 of said metallic structural elements 10 and 11 is therefore generally parallel the flange edge return portion 18 of each of said structural elements in the elongate dimension thereof. In the embodiment of the structural joint shown in FIG. 1, each of the metallic structural elements is provided with one or more continuous longitudinal ribs 19 extending the entire length of the structural members 10 and 11 along the elongate dimension thereof, said ribs 19 extending from the plane of the web into the channel portion of structural members 10 and 11, that is extending from the plane of the web in the same direction as the flanges extending therefrom. Said continuous longitudinal ribs 19 may or may not be located symmetrically between the flanges extending from said web and, indeed, need not be present at all should the anticipated concentrated loads and reaction forces, and the components thereof, not indicate to one skilled in the art that such web reinforcement is necessary to the task at hand.

FIG. 1 additionally shows, in the finished construction of the essentially perpendicular juncture of structural elements 10 and 11 to form joint 13, that connector and web stiffener 12 is essentially perpendicular the flanges 17 of each said structural member and that connector and web stiffener 12 is further essentially perpendicular the elongate or longitudinal axis of each of structural members 10 and 11. The use of connector and web stiffener 12 provides, especially when the surfaces of said connector 12 next adjacent the web portions 16 of structural members 10 and 11 are screw attached or otherwise attached one to another, a monolithic construction notwithstanding the ease of assembly of juncture 13. The ease of assembly or construction of juncture 13, whether in the field or at the job site or under sheltered conditions allowing pre-assembly of an array of structural members 10 and 11, provides one of the unexpected and advantageous characteristics of the invention here disclosed. The assembly or construction of the essentially mutually perpendicular juncture 13 of structural members 10 and 11 may be undertaken in several ways or methods. In one such method, the channel-shaped portion 15 of connector and web stiffener 12 is first inserted between the flanges 17 of the end of square-cut structural member 11 such that channel portion 15 is generally perpendicular said flanges 17 and perpendicular the elongate dimension of structural member 11; the subassembly of connector 12 in snug insertable engagement at the end of structural member 11 is then inserted between the flanges of structural element 10 such that rectangular portion 14 of connector 12 is roughly or generally parallel the web 16 and flanges 17 of structural member 10. All that is now required to obtain snug insertable engagement of rectangular portion 14 of connector 12 between the flanges 17 of structural member 10 and the receiving engagement of flange return edges 18 into slot portions 20 is the rotatable urging of the subassembly comprising structural member 11 having inserted therein the channel portion 15 of connector 12 into position in which rectangular portion 14 of connector 12 is essentially perpendicular the flanges 17 of structural member 10 and is also perpendicular to the longitudinal length of structural member 10. This first method of assembly of juncture 13 contemplates the simultaneous placement of a structural member 11 into perpendicular array with two structural members such as 10 mutually parallel one to another. Another method for the assembly or construction of juncture 13 between structural members 10 and 11 is the first insertion of connector 12 between the flanges of structural member 10, the generally rectangular hollow portion 14 of rotatably urging rectangular portion 14 of connector 12 into position perpendicular the flanges 17 of structural member 10 and therefore perpendicular the elongate dimension of structural member 10 thereby providing for the receiving engagement of flange return edges 18 into slot portions 20; the end portion of structural member 11 is then caused to be inserted upon channel portion 15 of connector and web stiffener 12 to effect an essentially perpendicular array between structural members 10 and 11 in which the web portions 16 of each said member are in essential perpendicularity and the flange portions 17 of each said member 10 and 11 are essentially co-planar.

While not shown to advantage in FIG. 1, but completely disclosed in other figures which are a part of this specification, particularly FIGS. 2, 4, 6, 8 and 9, it is apparent that rectangular portion 14 of connector 12 must be provided with means for the receiving engagement of flange return edges 18 of structural member 10.

Figure 2:
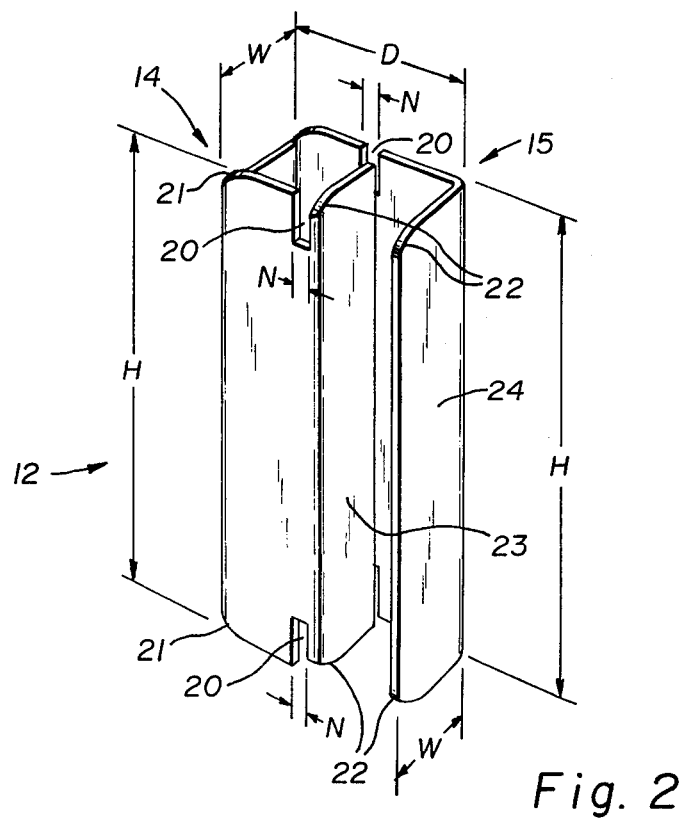
FIG. 2 is a perspective view of the connector and web stiffener of this invention.

FIG. 2 is a perspective view of connector and web stiffener 12 in an orientation identical to that shown in FIG. 1 in the construction of juncture 13 between structural members 10 and 11. This view of connector and web stiffener 12 shows to complete advantage the elements and features thereof. In particular, slot portions 20 of generally tubular and hollow rectangular portion 14 are completely illustrated; slot portions 20 are provided in the terminal or end edge of each wall of generally rectangular portion 14 distal that wall of rectangular portion 14 which, in final construction of juncture 13, is proximal the web 16 of structural member 10, and are positioned next adjacent the ends of the surface 23 of connector 12 which forms a common surface between rectangular portion 14 thereof and generally channel portion 15 thereof. It may readily be seen that, upon the insertion of generally rectangular portion 14 between the flanges 17 of structural member 10 at an angle to flanges 17, and upon bringing connector 12 into alignment perpendicular flanges 17 and perpendicular the elongate dimension of structural member 10 will cause the receiving engagement of flange return edges 18 of structural member 10 with slot portions 20, and each of them, of rectangular portion 14 of connector 12. Generally, the dimensions "H" of both rectangular portion 14 and channel portion 15 of connector 12 are identical, and are readily chosen to provide for the snug insertable engagement of rectangular portion 14 between flanges 17 of structural member 10, and the like snug insertable engagement of channel portion 15 into the end of structural member 11 and between parallel flanges 17 thereof. Dimension "N" is chosen so as to provide for the snug receiving engagement of flange return edges 18 therein upon rotatably urging rectangular portion 14 of connector 12 into alignment perpendicular flanges 17 of structural member 10 and perpendicular the elongate dimension thereof. To ease and make more facile the rotatable urging and snapping into position perpendicular the flanges and the elongate dimension of structural member 10, rectangular portion 14 is provided with a chamfer 21 between the surface thereof next adjacent the web 16 of structural member 10 and the end edge of each wall of the hollow rectangular section 14. Likewise, a chamfer 22 is provided in surfaces 23 and 24 the latter of which forms the leading surface of channel portion 15 for insertion into the end of structural member 11. A concomitant feature typifying the invention herein is that the rotatable urging providing a snap locking or snug insertable engagement of rectangular portion 14 of connector 12 with a first structural member 10, and the receiving engagement of flange return edges 18 of structural member 10 with slot portions 20 at the terminal or end edges of said rectangular portion 14, and the snug insertion of channel portion 15 of connector 12 into the end of a like structural member 11 is readily reversible, prior to screw or other fixed attachment through performance of the steps of assembly or construction of joint 13 in the reverse order. With regard to the first method of assembly or construction, the subassembly comprising structural member 11 and connector 12 may be rotatably urged along an axis parallel the web 16 of structural member 11 and perpendicular the elongate dimension of structural member 12 to rotatably snap disengage generally rectangular portion 14 of connector 12 from its snug insertable engagement between flanges 17 of structural member 10 and the receiving engagement of flange return edges 18 in slot portions 20 therein. With regard to the second method of assembly or construction, structural member 11 may be demounted from the subassembly comprising structural member 10 and connector 12 by exerting force sufficient in a direction parallel the elongate dimension of structural member 11 to effect disengagement of channel portion 15 of connector 12 from structural member 11. Connector and web stiffener 12 may then be removed from between the flanges 17 of structural member 10 by urging connector and web stiffener 12 toward either end of structural member 10 or by rotatably urging connector 12 from its position of snug insertable engagement between flanges 17 through the use of sharp blows, as from a hammer, impinging upon connector 12 at either end thereof.

A unique feature of the connector of this invention is that the initial rotatable urging and snapping into place of the rectangular portion 14 of connector 12 need not result in final placement or positioning of rectangular portion 14 "on-center"; the snug insertable engagement of channel portion 14 between the flanges 17 and adjacent the web 16 of structural member 10, as a result of the flexure of flanges 17 in a direction perpendicular web 16 in a direction also perpendicular the elongate dimension of structural member 10, provides sufficient give or play in that snug insertable but yielding engagement such that, even after engagement of rectangular portion 14 of connector 12 between flanges 17 of structural member 10, rectangular portion 14 may be urged with smart blows along the elongate axis of structural member 10 while remaining perpendicular thereto, and that urging may be accomplished whether or not structural member 11 is attached to channel portion 15 of connector 12.

Dimension "D" is chosen as provided in the publication *Specification for the Design of Cold-Formed Steel Structural Members* of the American Iron and Steel Institute of Washington, D.C. as promulgated on Sept. 3, 1980 in conformity with Section 3.5 and particularly with sub-Section 3.5.1 and Table 3.5.1-2 therein to provide adequate web stiffening at points intermediate the length of a structural member such as 10 or at the end of structural members such as 11 in withstanding concentrated loads or reactions or torsion forces, or the vector components thereof, acting either in the plane of the web of a structural member such as 11 or inducing distortion about the elongate axis thereof, and causing, respectively compressive or shear stresses therein.

Figure 3:
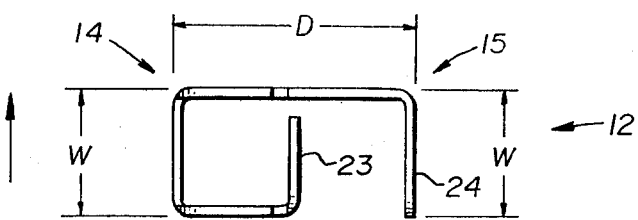
FIG. 3 is a top view of the connector and web stiffener of this invention.

Turning now to FIG. 3, connector and web stiffener 12 is shown in top view illustrating the integral structure thereof and showing to advantage the location of slot portions 20 for the receiving engagement of flange return edges 18.

Figures 4, 5:
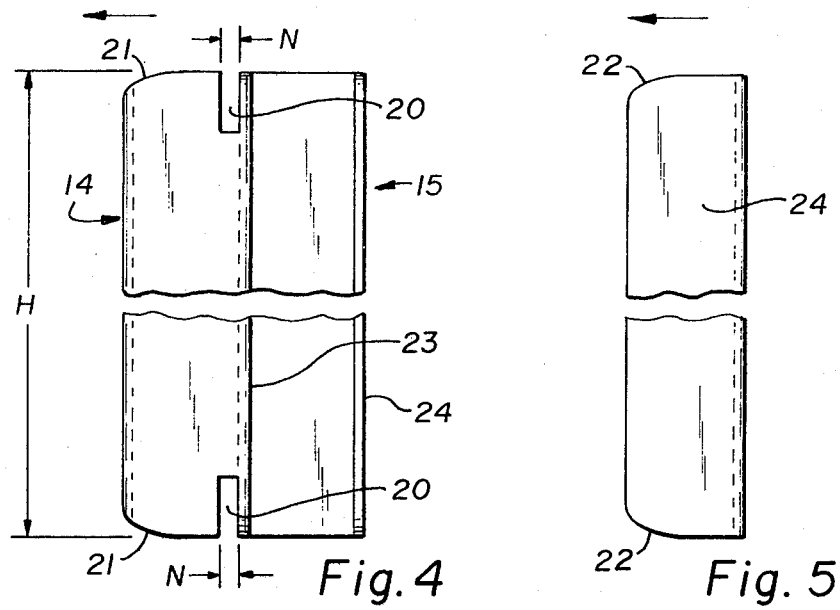
FIG. 4 is a frontal elevation view of the connector and web stiffener of this invention showing the rectangular portion on the left and the channel portion on the right.
FIG. 5 is a lateral elevation view obtained by the rotation of the presentation of FIG. 4 90° clockwise when looking down upon the presentation of FIG. 4.

FIG. 4 is a frontal elevation of the connector and web stiffener of this invention taken in the direction of the arrow in FIG. 3, and illustrates more clearly slot portion 20 at the terminal or end edge of each wall of rectangular portion 14 which, in final assembly or construction of juncture 13, is perpendicular that wall of rectangular portion 14 which is parallel and proximal the web and is perpendicular the elongate dimension of the generally C-shaped structural member 10 into which rectangular section 14 is inserted.

FIG. 5 is a side elevation of the connector and web stiffener of this invention taken in the direction of the arrow of FIG. 4 and illustrates the chamfers on the leading surface 24 of channel portion 15 of connector 12 for insertion into the square-cut end portion of a generally C-shaped structural member 11.

Figures 6, 7:
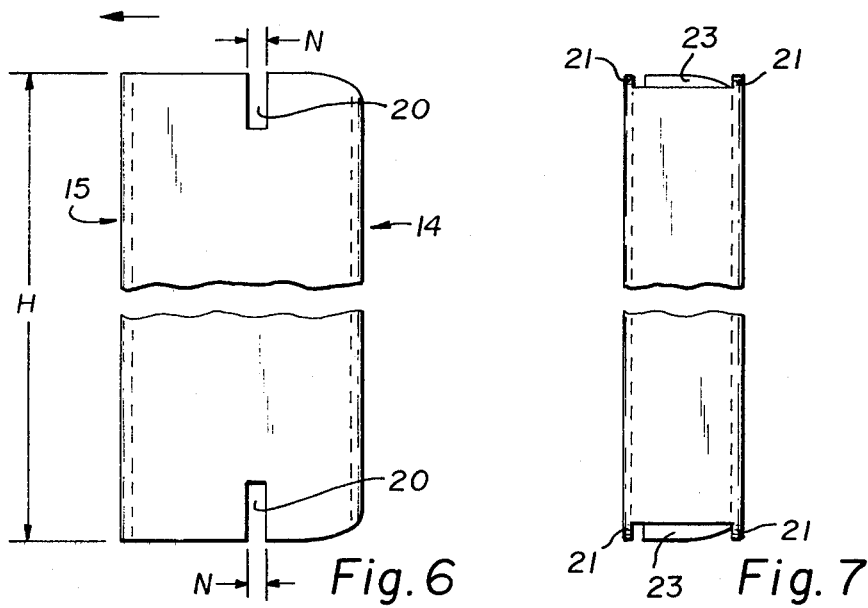
FIG. 6 is rear elevation obtained by rotating the presentation of FIG. 5 90° clockwise when viewed from the top.
FIG. 7 is a lateral elevation obtained by rotating the presentation of FIG. 6 90° clockwise when viewed from on top.

FIG. 6 is a rear elevation of the connector and web stiffener of this invention taken in the direction of the arrow of FIG. 5, and illustrates the web portion of the channel portion 15 and that wall of rectangular portion 14 integral therewith, and further illustrates slot portions 20 and the chamfers 21 in generally rectangular portion 14.

FIG. 7 is an additional side elevation taken in the direction of the arrow of FIG. 6 and illustrates that wall of the generally rectangular portion 14 of the connector and web stiffener of this invention which upon final assembly or construction is next adjacent the web 16 of the structural member 10 into which the rectangular portion is inserted and rotatably engaged between flanges 17 thereof; FIG. 7 further illustrates the chamfer between that surface and the imaginary plane formed by the terminal or end edges of the walls of rectangular portion 14.

Figure 8:
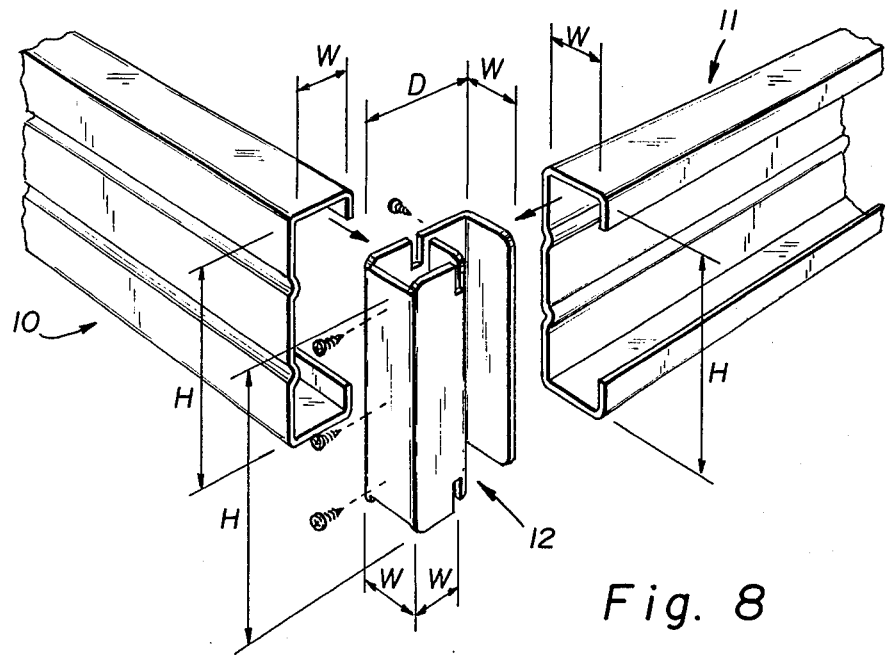
FIG. 8 is an exploded perspective view of the assembly of two generally C-shaped structural members in perpendicular array using the connector of this invention.

FIG. 8 illustrates, in exploded perspective view, the use of the connector and web stiffener of this invention in the assembly or construction of a juncture of two generally identical C-shaped structural members in essentially mutually perpendicular array. Dimensions "H" represent the nominal width between flanges of web portion 16 of generally C-shaped structural members 10 and 11 which are substantially identical, and the nominal height of both the generally rectangular hollow tubular section and the channel-shaped section of the connector and web stiffener of this invention, and dimensions "W" represent the nominal width of flanges 17 of the generally C-shaped structural members joined in mutually perpendicular array in assembly or construction with the connector and web stiffener of this invention, that is, "W" represents the nominal distance between web 16 and flange return edge 18 of said C-shaped structural members and also represents the nominal rectangular cross-sectional dimensions of portion 14 and the width of surfaces 23 and 24 of channel portion 15 of the connector and web stiffener 12 of this invention. Dimension "D", representing the depth of the connector and web stiffener of this invention along the integral portion thereof comprising the web portion of the channel section 15 and the wall of the rectangular section 14 perpendicular the web of said structural member may be determined by one skilled in this art according to the empirically derived specifications of the American Iron and Steel Institute of Washington, D.C. in its publication *Specification for the Design of Cold-Formed Steel Structural Members,* promulgated on Sept. 3, 1980, in particular reference to Section 3.5, and particularly sub-Section 3.5.1 and Table 3.5.1-2 therein. Likewise, the gauge or thickness of each the structural member and the connector and web stiffener of this invention may be chosen by one skilled in the art without the exercise of inventive skill after application of the aforesaid criteria governing design standards in the industry and as further elaborated upon in the publication *Commentary on the* 1968 *Edition of the Specification* for the *Design of Cold-Formed Steel Structural Members* in Section C. thereof entitled "Local Buckling of Thin Elements", and particularly sub-Section 7. therein entitled "Webs of Beams", which subsection provides in pertinent part:

"A theoretical analysis of this phenomenon is extremely complex since it involves a combination of non-uniform stress distribution (the stress is radiating out from the loaded length into the adjacent portions of the web), elastic and plastic instability due to stress so distributed, and local yielding in the immediate region of load application. The complexity is aggravated by the bending produced by eccentric application of the load caused by the curved transition from web to bearing flange. In view of this analytical complexity, reliance has to be placed almost exclusively upon experimental evidence."

Generally, the connector and web stiffener of this invention would be fabricated from and comprised of sheet metal of heavier gauge or greater thickness than the C-shaped structural members which it is intended to interconnect in generally perpendicular array.

Figure 9:
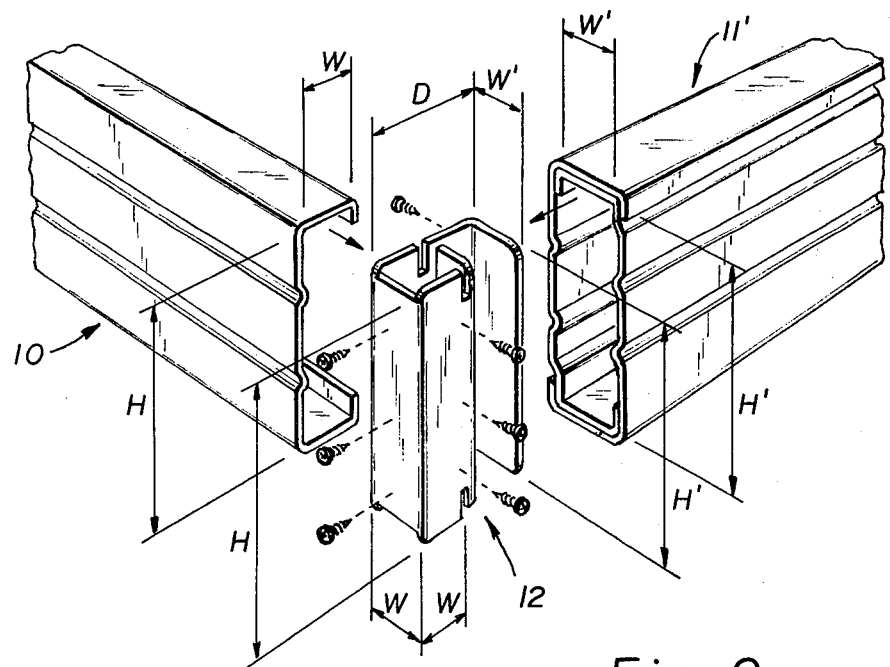
FIG. 9 is an exploded perspective view of a generally C-shaped structural member as the rim joist interconnected with a floor joist comprising two generally C-shaped structural members in mutual nested engagement along their elongate dimension.

FIG. 9 is an exploded perspective view of the juncture of a first generally C-shaped structural member 10 into which is rotatably urged and snap-inserted the rectangular portion 14 of the connector and web stiffener of this invention, and a second structural member 11' prime comprising two said C-shaped structural members in mutual nested engagement, each said structural member in nested engagement having a web integrally connecting flanges and forming a generally C-shaped channel, that web, however, including a shoulder portion adjacent a shorter said flange, said shoulder portion being displaced from the plane of the web inward toward the channel shape to provide for the nesting engagement on the exterior of said shoulder portion of the flange return edge pendent the longer flange of a like said member. Dimensions "H" and "H' prime" represent, respectively, the nominal width between flanges of web portion 16 of generally C-shaped structural member 10 and the nominal dimension between nested flanges of the generally C-shaped structural members comprising structural member 11' prime; depending upon the interflange width of the structural members comprising structural member 11' prime, "H" and "H' prime" of course need not be identical. Similarly, dimensions "W" and "W' prime" represent, respectively, the nominal distance between web 16 and flange return edge of generally C-shaped structural member 10 and the distance between web 16 and the flange return edge 18 and the shoulder portion adjacent a shorter flange of each of the generally C-shaped structural members comprising the nested engagement of structural member 11' prime. Of course, "W" and "W' prime" need not be identical. Dimension "D" is selected in accord with the provisions provided therefore as taught above with regard to FIG. 8.

It will be readily apparent to one skilled in this art that many variations and combinations in the joinder of generally C-shaped elongate structural members at generally right angles one to another are possible using the connector and web stiffener disclosed herein. Also readily apparent to one skilled in this art would be the use of the connector herein in other than the joinder of generally C-shaped elongate structural members in a flooring grid; for example, the connector herein could be used to cantilever structural members exterior of a closed grid; likewise, the connector herein could be used in the interconnection of bridging elements between mutually parallel elongate structural members. Finally, it is apparent that there is no limitation to the use of the connector herein in the assembly and construction of horizontal arrays of such structural members; the connector herein could readily be used in the construction of vertical arrays of such generally C-shaped elongate structural members where required, or in the construction of arrays of such structural members at any angle intermediate the vertical and the horizontal.

It is equally clear that one skilled in this relevant art, given the web-stiffening and load-transmitting function subserved by the connector taught herein, could, as do the inventors herein, chose to define each of the rectangular portion and the channel portion of said connector as a stanchion, that is, an upright prop, brace or support for the bearing of a load in the generally vertical dimension.

While the invention has been described in conjunction with specific embodiments thereof, it is evident that many alternatives, modifications and variations will be readily apparent to those skilled in the art in light of the foregoing disclosure. Accordingly, this disclosure is intended to embrace all such alternatives, modifications and variations which fall within the spirit and broad scope of the appended claims.

What is claimed is:

1. A connector for the interconnection in a mutually perpendicular array of at least first and second elongate generally C-shaped channel elements, each of said C-shaped channel elements having a web portion and a pair of generally parallel, spaced flanges connected along longitudinal sides of said web portion each of said flanges further including a flange return edge extending perpendicularly from a free edge of said flange inwardly of the generally C-shaped channel element and generally parallel to the web portion thereof, said connector comprising:
   a tubular portion of generally rectangular cross-section, said tubular portion having spaced side and end walls and being dimensioned such that one of said end walls and both said side walls are received within said first C-shaped channel element between the flanges and adjacent the web of said first C-shaped channel element with said side walls of said tubular portion of said connector being perpendicular to the longitudinal length of said web and perpendicular to said flanges, said side walls of said tubular, generally rectangular portion of said connector having slots positioned to receive said return flanges of said first generally C-shaped channel element when said tubular, generally rectangular portion of said connector is received within said C-shaped channel element; and,
   a generally channel-shaped portion including a connector web integral with, and being an extension of one of said side walls of said tubular, generally rectangular portion of said connector, and a connector flange secured at a first end to a free end of said connector web generally perpendicular thereto, said connector flange being parallel to the web of said first C-shaped channel element, said channel-shaped portion of said connector being dimensioned to be insertable within said second C-shaped channel element between the flanges thereof and perpendicular to the longitudinal length of said second C-shaped channel element.

2. The connector of claim 1 comprised of steel.

3. The connector of claim 1 comprised of galvanized metal.

4. A web-stiffening structural joint assembly in a mutually perpendicular array including at least first and second elongate generally C-shaped elongate channel elements, each of said C-shaped channel elements having a web portion and a pair of generally parallel, spaced flanges connected along longitudinal sides of said web portion, each of said flanges further including a flange return edge extending perpendicularly from a free edge of said flange inwardly of the generally C-shaped channel element and generally parallel to the web portion thereof, and a connector interconnecting said elongate generally C-shaped channel elements at generally a right angle one to another, said connector comprising:
   a tubular portion of generally rectangular cross-section, said tubular portion having spaced side and end walls and being dimensioned such that one of said end walls and both said side walls are positioned within said first said C-shaped channel element between the flanges and adjacent the web of said first C-shaped channel element with said side walls of said tubular portion of said connector being perpendicular to the longitudinal length of said web and perpendicular to said flanges, said side walls of said tubular, generally rectangular portion of said connector having slots positioned receiving the return flanges of said first generally C-shaped channel element; and
   a generally channel-shaped portion including a connector web integral with, and being an extension of one of said side walls of said tubular, generally rectangular portion of of said connector, and a connector flange secured at a first end to a free end of said connector web generally perpendicular thereto, said connector flange being parallel to the web of the first C-shaped element, said channel-shaped portion of said connector being dimensioned to be positioned within said second C-shaped channel element between the flanges thereof and perpendicular to the longitudinal length of said second C-shaped channel element.

5. The assembly of claim 4 wherein the web of at least one said elongate generally C-shaped channel element comprises at least one continuous longitudinal rib extending the length of said structural member.

* * * * *